(12) United States Patent
Mardirossian

(10) Patent No.: US 6,732,022 B2
(45) Date of Patent: May 4, 2004

(54) CONTROL SYSTEM FOR AIR VEHICLE AND CORRESPONDING METHOD

(75) Inventor: Aris Mardirossian, Germantown, MD (US)

(73) Assignee: Technology Patents, LLC, Derwood, MD (US)

(*) Notice: Subject to any disclaimer, the term of this patent is extended or adjusted under 35 U.S.C. 154(b) by 29 days.

(21) Appl. No.: 10/157,013

(22) Filed: May 30, 2002

(65) Prior Publication Data

US 2003/0225486 A1 Dec. 4, 2003

(51) Int. Cl.[7] .............................. G05D 1/00; G06F 7/00
(52) U.S. Cl. ................................ 701/3; 701/9; 701/14; 701/301; 340/541; 340/963; 342/30; 342/357.09
(58) Field of Search .......................... 701/3, 14, 4, 9, 701/11, 16, 23, 24, 120–122, 300–302, 35; 455/66.1, 431, 456.1; 340/943, 961, 963, 825.69, 539.1, 947, 973, 531, 532, 539.13, 539.22, 540, 541; 703/217, 227, 230, 249; 342/29, 30, 32, 36–38, 357.01, 357.06, 357.07, 357.09, 357.13, 431

(56) References Cited

U.S. PATENT DOCUMENTS

| | | | |
|---|---|---|---|
| 4,729,102 A | 3/1988 | Miller, Jr. et al. ............ 701/14 |
| 4,816,828 A | 3/1989 | Feher ......................... 340/945 |
| 5,283,643 A | 2/1994 | Fujimoto .................... 348/143 |
| 5,414,631 A * | 5/1995 | Denoize et al. ............. 701/301 |
| 5,426,476 A | 6/1995 | Fussell et al. ................ 396/12 |
| 5,467,274 A | 11/1995 | Vax ............................. 701/14 |
| 5,548,515 A | 8/1996 | Pilley et al. ................ 701/120 |
| 5,714,948 A * | 2/1998 | Farmakis et al. ........... 340/961 |
| 5,798,458 A | 8/1998 | Monroe ........................ 73/587 |
| 5,890,079 A | 3/1999 | Levine ........................ 701/14 |
| 6,028,624 A | 2/2000 | Watkins ...................... 348/122 |
| 6,253,064 B1 | 6/2001 | Monroe ...................... 455/66.1 |
| 6,308,045 B1 * | 10/2001 | Wright et al. ............... 455/431 |
| 6,584,383 B2 * | 6/2003 | Pippenger ...................... 701/3 |
| 2003/0090382 A1 * | 5/2003 | Shear ......................... 340/574 |
| 2003/0093193 A1 * | 5/2003 | Pippenger ...................... 701/3 |
| 2003/0094541 A1 * | 5/2003 | Zeineh .................... 244/118.5 |
| 2003/0130771 A1 * | 7/2003 | Crank ........................... 701/4 |
| 2003/0158943 A1 * | 8/2003 | Kim et al. ................... 709/227 |

FOREIGN PATENT DOCUMENTS

DE    19608516 A1 * 9/1997    ........... B64D/45/00

* cited by examiner

Primary Examiner—Jacques H. Louis-Jacques
(74) Attorney, Agent, or Firm—Nixon & Vanderhye P.C.

(57) ABSTRACT

A system and/or method is/are provided which reduces the likelihood of air vehicles being utilized by terrorists as weapons. In certain embodiments, when it is determined that the air vehicle is about to hit a designated structure (e.g., high-rise office building or apartment building, national monument, and/or government building), a controller automatically takes control of the air vehicle away from the pilot(s) and causes an automatic computerized pilot (autopilot) to take over control of the air vehicle and causes it to land at a selected airport and/or runway.

4 Claims, 2 Drawing Sheets

CONTROL SYSTEM FOR AIR VEHICLE AND CORRESPONDING METHOD

This application relates to a control system for an air vehicle, and corresponding method. In particular, the control system and/or method herein is/are adapted to reduce and/or prevent acts of terrorism using air vehicles such as commercial airliners, private planes, helicopters, and/or the like.

BACKGROUND OF THE INVENTION

It has been shown that commercial airliners are susceptible to use by terrorists. For instance, the acts carried out on September 11 emphasize the fact that commercial airliners in their current state can be dangerous weapons if they fall into the wrong hands.

It will be apparent to those skilled in the art that there exists a need for a control system and/or method that reduces the likelihood of such acts of terrorism being committed using air vehicles.

SUMMARY OF THE INVENTION

An object of this invention is to reduce the likelihood of terrorists being able to utilize air vehicles as weapons.

Another object of this invention is to provide air vehicles with a control system(s) which detects when the air vehicle is about to hit a designated structure (e.g., high-rise building, monument of national and/or local importance, government building, or the like). Upon detecting the same, the control system disengages the air vehicle from pilot control and causes it to automatically land at an appropriate airport and/or runway (e.g., the nearest available runway stored in on-board memory). In other words, if the control system detects that the air vehicle is about to hit a designated structure, it goes into a mode where the control system automatically corrects the vehicle's course and prevents further pilot control, thereby causing the air vehicle to land at a selected airport and/or runway.

Another object of this invention is to fulfill one of more of the aforesaid objects and/or needs.

In certain example embodiments of this invention, one or more of the above-listed objects and/or needs is/are satisfied by providing a method of controlling an air vehicle, the method comprising: storing locations of respective designated structures in a memory, the designed structures including high-rise building, monuments, and/or government building; determining whether an in-flight air vehicle is on a flight path and/or potential flight path which may cause the air vehicle to hit one or more of the designated structures within a predetermined time period; when it is determined that the air vehicle is on such a flight path, automatically preventing pilot(s) from further controlling the air vehicle and causing the air vehicle to land at a selected runway and/or airport.

DETAILED DESCRIPTION OF CERTAIN EXAMPLE EMBODIMENTS

Certain example embodiments of the instant invention relate to a control system for an air vehicle (e.g., commercial airliner, private plane, helicopter, or the like) which prevents (and/or reduces the likelihood of) air vehicles equipped with such control system(s) from being used as weapons by terrorists. In particular, certain example embodiments of this invention function to detect when an air vehicle is about to hit a designated structure, and when this is detected, the control system immediately and automatically prevents the pilot(s) from further controlling the air vehicle and causes the auto-pilot to take over control of the air vehicle thereby causing it to land at a selected runway and/or airport. Horrific acts of terrorism can be reduced accordingly.

An example embodiment of this invention will be described with respect to FIGS. 1–2.

Figure 1:
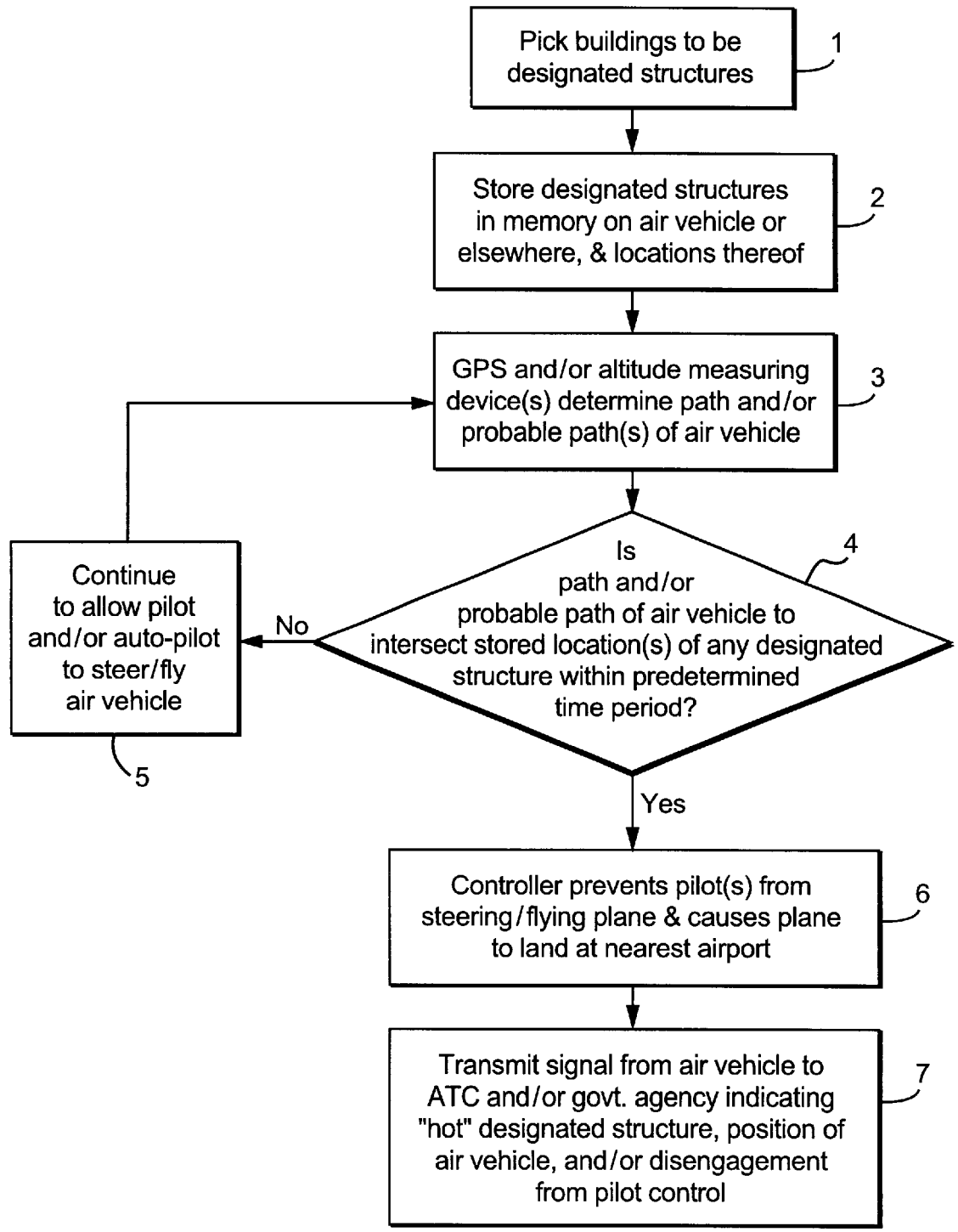
FIG. 1 is a flow chart illustrating certain steps carried out in an example embodiment of this invention.
Figure 2:
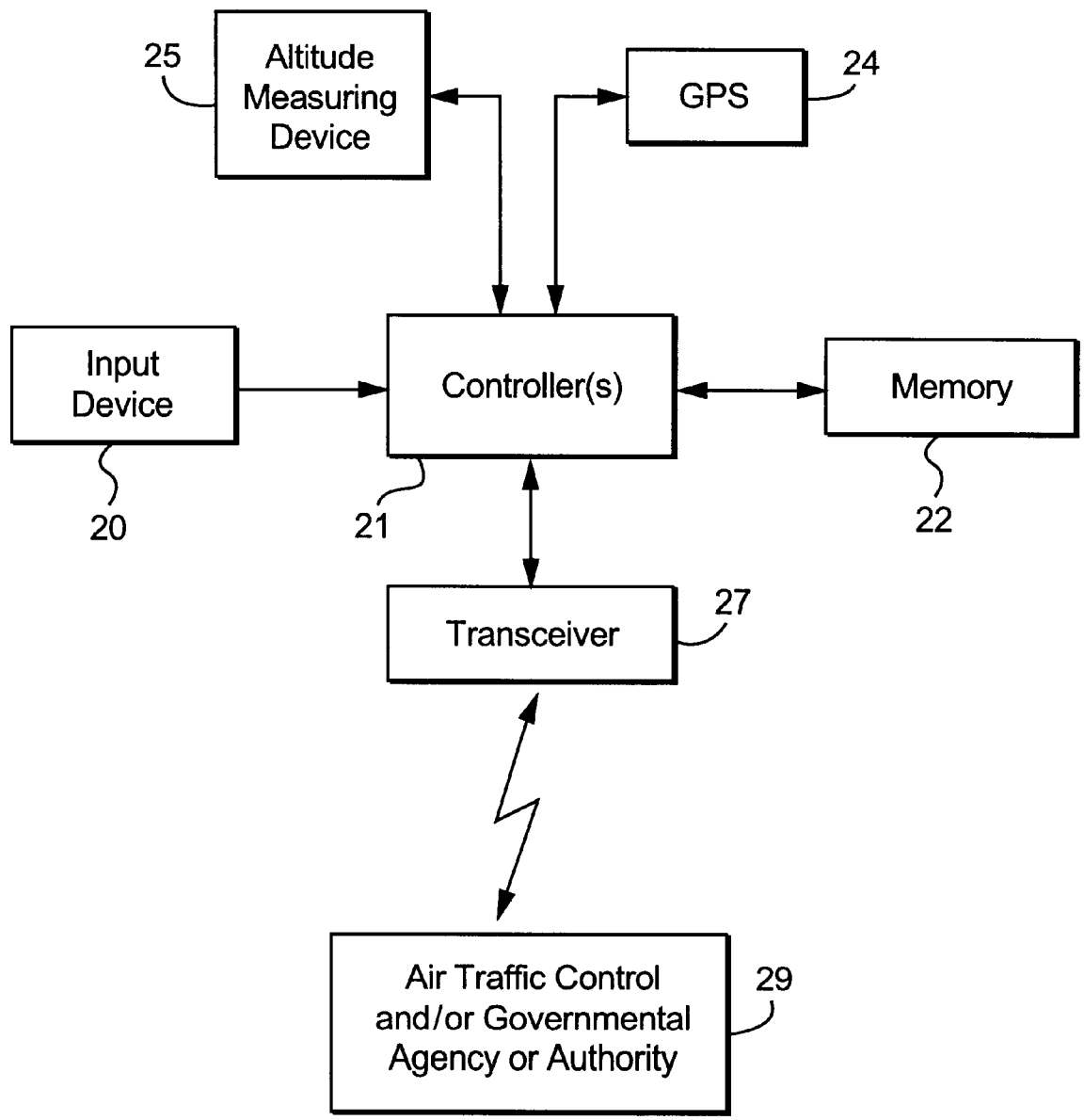
FIG. 2 is a block diagram of an air vehicle control system according to an example embodiment of this invention.

One or more structures to be protected are first determined and designated (see step 1 in FIG. 1). In certain example embodiments of this invention, not all buildings are picked as "designated structures." For example, only high-rise office buildings, high-rise apartment buildings, monuments, and/or government buildings may be chosen as designated structures in certain example non-limiting embodiments. For example, all buildings over 30 stories high may be picked as designated structures. Alternatively, all buildings having a height greater than 500 feet may be picked as designated structures. These thresholds are provided for purposes of example only, and are not intended to be limiting. Instead, these thresholds are utilized to emphasize that not all buildings are "designated structures" in certain embodiments of this invention. A building must satisfy or meet a predetermined threshold (e.g., height, number of floors, monument status, and/or government agency/building) before it is chosen as a designated structure. Designated structures may be selected in one or more countries according to different embodiments of this invention.

After being chosen, input device 20 is utilized in order to input the designated structures thereby causing controller 21 to store the designated structures in memory 22 on board the air vehicle. The designated structures may be stored in the memory in terms of their respective location(s) (e.g., GPS coordinate location) and/or height/altitude (see step 2 in FIG. 1). While it is preferred that a memory 22 on the air vehicle be utilized to store the designated structures, it is also possible that the same may be stored at a remote location.

The air vehicle is equipped with both a known coordinate detection system (e.g., GPS) 24 as well as at least one altitude measuring device 25. Controller 21 receives position data concerning the air vehicle while in flight. This position data may be, for example and without limitation, coordinate data from at least GPS system 24, speed data, and/or altitude data from device 25 reflecting the status (e.g., location, speed, etc.) of the air vehicle. Based at least upon these input(s), controller 21 determines at least one, and potentially more than one flight path(s) and/or a likely flight path(s) of the air vehicle (see step 3 in FIG. 1).

Controller 21 then compares this determined flight path(s) with all designated structures stored in memory 22 in order to determine if any of the determined and/or likely flight path(s) will intersect one of the designated structures (see step 4 in FIG. 1). In other words, controller 21 makes a determination as to whether the air vehicle may be about to hit one of the designated structures.

In certain embodiments of this invention, a predetermined time threshold is utilized in order to reduce false alarms. Such a threshold may be, for example and without limitation, ten seconds, 15 seconds, 30 seconds, and/or the like. For example, the controller 21 may determine whether the determined flight path(s) may and/or will intersect (or come within a predetermined distance of) any of the designated structures stored in memory 22 within the predetermined time period (e.g., within the next 30 seconds). Again, see step 4 in FIG. 1.

When the controller 21 determines that no determined flight path(s) (potentially including likely flight path(s)) intersects or comes close to a designated structure stored in memory 22 (i.e., when the controller 21 determines that the air vehicle is not about to hit a designated structure), the flow chart proceeds to step 5 in FIG. 1 where the control system continues to allow the pilot and/or auto-pilot to control (steer and/or fly) the air vehicle. However, when controller 21 determines that one or more of the determined flight path(s) of the air vehicle may intersect with (i.e., hit or come close to) at least one designated structure stored in memory 22 within a predetermined time period (e.g., 15 seconds or some other time period/threshold), then the controller immediately prevents the pilot(s) from further control (steering and/or flying) of the air vehicle and causes the auto-pilot to take over the air vehicle control and causes it to land at a proximate airport and/or runway (see step 6 in FIG. 1). In such a manner, the control system is capable preventing terrorists from utilizing commercial planes, private planes, helicopters, and/or the like as weapons.

In certain embodiments of this invention, when the controller 21 does determine that the air vehicle is about to hit a designated structure (see step 4 in FIG. 1), the controller causes transceiver 27 to transmit a signal (e.g., radio signal, satellite signal, and/or the like) to air traffic control and/or a government authority 29 indicating that the same has been detected. This automatic signal may include the GPS coordinates of the air vehicle, its air speed, its altitude, the time of the detection, the designated structure(s) about to be hit, and/or the vehicle's potential/actual flight paths. This detection may also automatically cause air vehicle data such as instrument readings, cabin pressure, video camera readings, black box data, and/or the like to be sent to 29 along with the other data. The purpose of this transmission is to advise air traffic control and/or a government authority that the air vehicle may be subject to hijacking and that it is in the course of landing at a nearby airport and/or runway. Moreover, the black box data and/or flight data recorder data may be downloaded with this signal in order to quickly store it at a location off of the plane so that if the plane should crash or the like the data is quickly and efficiently accessible.

In certain example embodiments, the air traffic control and/or government authority 29 may send a return signal to transceiver 27 so as to instruct controller 21 as to which airport/runway to land at, and/or to instruct the controller 21 as to how to fly the plane and in what direction, speed, altitude, etc. In such a manner, the authorities can be automatically and promptly notified of a potential hijacking by controller 21, even if the pilot(s) of the plane is unwilling to make a radio communication (e.g., if a hijacker has taken over the plane). (See step 7 in FIG. 1). Disasters can be prevented and/or reduced.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of controlling an air vehicle, the method comprising:

storing locations of respective designated structures in a memory, the designed structures including at least one of high-rise buildings, monuments, and government buildings;

determining whether an in-flight air vehicle is on a flight path or potential flight path which may cause the air vehicle to hit one or more of the designated structures within a predetermined time period;

when it is determined that the air vehicle is on such a flight path, (a) automatically preventing pilot(s) from further controlling the air vehicle and causing the air vehicle to land at a selected runway and/or airport, and (b) automatically causing a signal, including each of GPS coordinates of the air vehicle, black box data of the vehicle, air speed of the vehicle, altitude of the vehicle, and designated structure(s) in the detected flight path of the vehicle, to be transmitted from the air vehicle to a remote location(s) including at least one of air traffic control and a governmental authority.

2. The method of claim 1, further comprising a step of automatically sending an alarm signal to at least one of air traffic control and a government authority when it is determined that the air vehicle is on such a flight path.

3. The method of claim 1, wherein the predetermined time period is less than one minute.

4. The method of claim 1, wherein a controller on board the air vehicle utilizes position data from both a GPS device and an altitude measuring device in order to determine potential or actual flight paths of the air vehicle, and wherein flight paths are compared with designated structures stored in memory in order to make a determination as to whether pilot(s) should be prevented from further controlling the air vehicle.

* * * * *